United States Patent [19]

Miller

[11] 3,850,675

[45] Nov. 26, 1974

[54] USE OF ULTRAVIOLET LIGHT TO CURE UNCURED SURFACE LAYER RESULTING FROM AIR INHIBITION IN PRECEDING HIGH ENERGY IONIZING RADIATION CURING PROCESS

[75] Inventor: Lewis S. Miller, Bellevue, Wash.

[73] Assignee: Weyerhaeuser Company, Tacoma, Wash.

[22] Filed: Jan. 15, 1973

[21] Appl. No.: 323,716

Related U.S. Application Data

[63] Continuation-in-part of Ser. No. 93,856, Nov. 30, 1970, abandoned.

[52] U.S. Cl...... 117/93.31, 117/132 B, 117/132 BE, 117/132 C, 117/148, 117/155 UA, 204/159.23
[51] Int. Cl.............................................. B44d 1/50
[58] Field of Search......... 117/93.31, 161 R, 161 K, 117/161 P, 161 L, 161 UT; 204/159.11, 159.15, 159.23; 260/28.5

[56] References Cited

UNITED STATES PATENTS 3,531,317  9/1970  Patheiger et al................ 117/93.31

*Primary Examiner*—William D. Martin
*Assistant Examiner*—John H. Newsome
*Attorney, Agent, or Firm*—Christensen, O'Connor, Garrison & Havelka

[57] ABSTRACT

When the curing of polymerizable films by exposure to ionizing radiation is carried out with the film surfaces in contact with air, tacky or otherwise undercured surfaces often result because of oxygen inhibition of polymerization. Such undercured surfaces can be eliminated by exposing them to ultraviolet light.

8 Claims, No Drawings

USE OF ULTRAVIOLET LIGHT TO CURE UNCURED SURFACE LAYER RESULTING FROM AIR INHIBITION IN PRECEDING HIGH ENERGY IONIZING RADIATION CURING PROCESS

CROSS-REFERENCE TO RELATED APPLICATION

This application is a continuation-in-part of my co-pending application Serial No. 93,856, filed November 30, 1970 (now abandoned).

BACKGROUND OF THE INVENTION

It is known that many polymerizable systems can be cured by exposing them to ionizing radiation. The use of ionizing radiation, and particularly electron beam radiation, has a number of distinct advantages over conventional methods of effecting polymerization and cross-linking using catalytic agents, especially when used to cure film coatings on wood and wood products, fabrics, rubber, glass, metal and similar substances. For example, it avoids the sometimes lengthy induction period associated with catalyst-induced curing, enables the use of film-forming compositions having indefinite pot lives, produces little temperature rise during polymerization, and produces, in many cases, a superior coating-to-substrate bond. Many films can be cured in less than one second using high-energy electrons. Unfortunately, however, if the uncured film is allowed to come into contact with air, oxygen inhibition of ionizing radiation curing often results in the surface or surfaces of the film being tacky or otherwise not as well cured as the bulk of the film. Although the undercured material is present only in a very thin layer, i.e., on the order of from $1 \times 10^{-3}$ to $1 \times 10^{-6}$ inch, this is sufficient to cause serious losses of coating gloss and problems with scratching. When the film is in the form of a coating on articles such as wood panels, blocking can occur when the articles are stored in a stacked relationship.

Undercured surfaces caused by oxygen inhibition can usually be avoided by covering the uncured film with an inert cover sheet or by maintaining the film in an oxygen-free atmosphere until curing is effected. These techniques, however, are often impractical or too expensive for commercial operations.

SUMMARY OF THE INVENTION

It has now been found that undercured surfaces of films resulting from oxygen inhibition of curing by ionizing radiation can be eliminated by exposure thereof to ultraviolet light. Using a high-intensity source of ultraviolet light, this ordinarily can be accomplished by exposure for less than one minute. Quite surprisingly, undercured surfaces can be rapidly eliminated by exposure to ultraviolet light even in the absence of free radical catalysts or photo-initiators in the film.

A particularly advantageous system for the rapid and complete curing of polymerizable films results from the combination of an electron beam and ultraviolet light. Through the use of the former, the curing of relatively thick and opaque films can be accomplished so rapidly that no bubbling of volatile components and no excessive absorption of the uncured film into porous substrates can occur. The thin undercured surface layer which ordinarily remains is easily penetrated and rapidly cured by the ultraviolet light.

The method of this invention is applicable to any polymerizable film which upon being exposed to ionizing radiation is cured to the desired degree except for a thin undercured surface layer resulting from oxygen inhibition of polymerization induced by ionizing radiation. In general, such compositions include those which are polymerizable through free radical mechanisms. A preferred class of such compositions are the polymerizable resins having terminal acrylate or methacrylate groups disclosed in my U.S. application Ser. No. 721,152, filed Apr. 15, 1968, now U.S. Pat. No. 3,560,237 (application for reissue Ser. No. 193,580 filed Oct. 28, 1971), which applications are incorporated herein by reference. The resins can be prepared (1) by reacting a polyfunctional material selected from the group consisting of (a) dicarboxylic acids and acid chlorides having from 3 to 15 carbon atoms and (b) polyisocyanates having terminal reactive isocyanate groups with a 2-hydroxyalkyl acrylate or 2-hydroxyalkyl methacrylate; or (2) by reacting a polyepoxide with a half ester of a 2-hydroxyalkyl acrylate or methacrylate and a dibasic acid. These resins can be used undiluted or dissolved in up to 50% of a vinyl monomer.

Other compositions useful in the method of this invention are the alpha-beta, olefinically unsaturated organic resins disclosed in U.S. Pat. No. 3,437,514, which is also incorporated herein by reference. These include unsaturated polyester resins, acrylic resins, modified-acrylic resins, urethane-modified organic resins, silicone-modified organic resins, and epoxy resins.

Vinyl monomers in which the above-mentioned resins can be dissolved include, for example, monovinyl aromatic hydrocarbons of the benzene series such as styrene, vinyl toluene, ethyl vinyl benzene, isopropyl styrene, tert-butyl styrene, sec-butyl styrene and mixtures thereof, $\alpha$-methyl styrene; divinyl compounds of the benzene series such as divinyl benzene; acrylic acid, vinyl acetate, diacetone acrylamide, methyl methacrylate, ethyl methacrylate, n-butyl acrylate, ethyl acrylate, cyclohexyl acrylate, $\beta$-hydroxyethyl acrylate, and the like.

The expression "ionizing radiation" as used herein is intended to include both particulate radiation, such as highly accelerated electrons, protons, neutrons, alpha particles, deuterons and beta particles, and electromagnetic radiation such as x-rays and gamma rays but not to include ultraviolet radiation. This included radiation is generally referred to in the art as high energy ionizing radiation. The dose of ionizing radiation necessary to cure a given film will depend on the dose rate, temperature, and thickness and composition of the film. Effective results are obtained, for example, by using high energy electrons of from 20,000 to 10,000,000 electron volts and dose rates of from 1 megarad per minute to 10 megarads per second. The use of an electron beam of sufficient voltage and intensity to penetrate the full thickness of the film and to effect curing in several seconds or less is preferred.

Any type of ultraviolet light source including shortwave fluorescent lamps, longwave fluorescent lamps, mercury vapor lamps, and even sunlight can be used to effect surface cure. Shortwave sources, however, eliminate undercured surfaces much more rapidly than do longwave sources. High-intensity quartz mercury-vapor arc lamps are especially preferred where speed of surface cure is of importance. Intensities in the range of from 5 to 15 watts per square inch per minute are preferred, but lower intensities can be used if longer cure times can be tolerated. The length of exposure to ultraviolet light necessary to effect surface cure depends on the intensity of the ultraviolet light source, the degree to which the surface is undercured, and the composition of the film. Surfaces exposed about three inches below a 1200-watt quartz mercury-vapor lamp can ordinarily be cured to the desired degree in from two to twenty seconds.

As noted previously, rapid surface curing using ultraviolet light can be readily achieved in the absence of any free radical catalyst or photo-initiator. In some instances, however, the addition of free radical generating catalysts, such as benzoyl peroxide and azo-bis isobutyronitrile, or photo-initiators such as benzoin and 2,3-butanedione may enable even more rapid elimination of undercured surfaces. Energy in the visible range from unfiltered ultraviolet light sources is also more effective when such photo-initiators are present.

The method of this invention is especially well suited for the curing of films in the form of clear coating on hardwood plywood panels, particleboard, overlayed softwood plywood, solid fiberboard and paper carton board and for the curing of pigmented coatings (containing, for example, titanium dioxide, calcium carbonate, zinc oxide or talc) on wood siding, hardboard, plywood, steel, tin and aluminum. This method is also well suited for the curing of unsupported films and the curing of surfaces of porous materials impregnated with ionizing radiation-curable liquids. For example, impregnated paper and wood can be cured by this method to produce paper-plastic and wood-plastic combinations.

The following examples are provided by way of illustration and are not intended to be in any way limiting of the invention. All parts are by weight unless otherwise indicated.

EXAMPLE 1

A coating formulation is prepared by dissolving 20 parts of butyl acrylate in 80 parts of a vinyl ester resin prepared by reacting the half-ester condensation product of 2 moles 2-hydroxyethyl acrylate and 2 moles maleic anhydride with 1 mole bisphenol A diglycidyl ether. A 0.003-inch coating of this formulation is spread on the surface of hardboard siding. The coated siding is then passed two times at 50 feet per minute under an electron beam operating at 300,000 volts and 20 milliamps. The beam has an 18-inch scan and the total dosage is 8.5 megarads. The coating has cured hard but the surface is slightly tacky and can be readily scratched. The coating is then exposed to a 100-watt quartz mercury lamp at a distance of 1½ inches with no filter for a period of 30 seconds. After cooling, the surface has no trace of tackiness and does not leave a white mark when scratched with a coin.

EXAMPLE 2

A 0.005-inch coating of a formulation similar to that of Example 1, but consisting of 25 parts of n-butyl acrylate and 75 parts of the vinyl ester resin used in Example 1, is drawn on plywood and subjected to electron beam irradiation as in Example 1. The coating has again cured hard but has a tacky surface. The coated board is then passed at a distance of three inches and at a rate of 20 feet per minute under a 12-inch long, 1200-watt Hanovia quartz mercury-arc lamp having a 4-inch wide reflector. After five successive passes, the surface is tack-free but still leaves a white mark on scratching. After five additional passes (for a total exposure of 10 seconds under the reflector) the surface no longer leaves a white scratch mark and exhibits the same hardness properties as an identical coating cured in contact with a covering film of polyethylene terephthalate to prevent surface cure inhibition by oxygen.

EXAMPLE 3

To the coating formulation of Example 2 is added one part glycidyl acrylate and 0.5 part of benzoin. After being cured by an electron beam as in Example 1 the coating is cured hard but the surface is tacky. After being passed under the 1200-watt lamp described in Example 2 five times at a rate of 20 feet per minute (for a total exposure of 5 seconds), the surface is tack-free and does not give a white mark upon scratching.

EXAMPLE 4

A coating consisting of (a) 17.5 parts of vinyl ester resin produced by reacting the half-ester condensation product of 2 moles 2-hydroxyethyl acrylate and 2 moles maleic anhydride with 1 mole bisphenol A diglycidyl ether, (b) 17.5 parts of vinyl ester resin produced by reacting the half-ester condensation product of 2 moles 2-hydroxypropyl acrylate and 2 moles maleic anhydride with 1 mole butanediol diglycidyl ether, (c) 15 parts n-butyl acrylate, (d) 30 parts titanium dioxide and (e) 20 parts of talc is spread on plywood and irradiated under an electron beam as in Example 1. The hard, resilient, white coating obtained has a tacky surface which is then cured to a tack-free state by passing it six times at 60 feet per minute (a total of 2 seconds exposure) under the 1200-watt lamp described in Example 2.

EXAMPLE 5

A conventional unsaturated polyester resin, Polylite 31-583 (a semi-rigid unsaturated polyester dissolved in vinyl toluene—Reichhold Chemical Co.), is spread on metal foil at a thickness of 0.005-inch. After three passes under the electron beam as in Example 1 at 60 feet per minute the film will snapbreak upon bending but is very tacky on the surface. After 10 passes under the 1200-watt lamp described in Example 2 at a rate of 20 feet per minute (a total of 10 seconds exposure), the surface was hard and free of tack.

EXAMPLE 6

A resin solution is prepared by reacting 100 parts polypropylene glycol (molecular weight 400), 78.2 parts toluene diisocyanate, 91 parts 2-hydroxyethyl acrylate and 0.2 part tin octoate at 60°C. A 0.004-inch thick coating is spread onto carton board and the coating is irradiated by passing the board three times at 84 ft. per min. under the electron beam as in Example 1. The total dose is 6 megarads. The resulting clear coating is flexible and firm, but has a tacky surface. The board is passed five times under ultraviolet light as in Example 2 to give a tack-free coating.

EXAMPLE 7

Example 6 is repeated with the modification that a 0.007-inch coating is applied. Identical results are obtained.

EXAMPLE 8

The pigmented coating mix of Example 4 with 0.5% benzoin added is spread on overlayed plywood at a thickness of 0.011-inch. The coating is irradiated as in Example 1 at 60 ft. per min. for three passes to give a hard but tacky coating. After five passes at 20 ft. per min. under the untraviolet lamp as in Example 2, the surface is tack-free and is not scratched by a coin.

EXAMPLE 9

Example 8 is repeated with the modification that the hard but tacky coating obtained after irradiation is passed at a distance of three inches under a 12-inch, 1800-watt "Chromolux" infra-red lamp having a four inch wide reflector. After ten passes under the lamp at 60 ft. per min., there is no reduction of surface tackiness. Continuous exposure of the coating under the lamp for several seconds results in darkening of the surface without eliminating tackiness.

EXAMPLE 10

A 0.005-inch coating of a formulation consisting of 100 parts of the formulation used in Example 2 and 0.5 part of triphenylphosphine is drawn onto mahogany-surfaced plywood. As in Example 2, the coating is subjected to electron beam irradiation and then repeatedly passed under the ultraviolet lamp. After only five passes, the initially tacky surface of the otherwise hard coating leaves no white mark upon scratching.

What is claimed is:

1. In a process wherein curing of a polymerizable film is effected by exposure thereof to ionizing radiation and after said exposure there remains on a surface of said film a thin undercured layer resulting from inhibition of said curing by oxygen, the improvement comprising exposing said undercured layer to ultraviolet light for a time sufficient to complete the cure of said layer.

2. The process of claim 1 wherein said ionizing radiation is an electron beam.

3. The process of claim 2 wherein the source of said ultraviolet light is a quartz mercury-vapor arc lamp.

4. The process of claim 1 wherein as said film is a coating on a substrate.

5. The process of claim 4 wherein said ionizing radiation is an electron beam.

6. The process of claim 5 wherein the source of said ultraviolet light is a quartz mercury-vapor arc lamp.

7. The process of claim 1 wherein said polymerizable film contains a photo-initiator.

8. The process of claim 7 wherein said photo-initiator is benzoin.

* * * * *